(12) United States Patent
Wiran

(10) Patent No.: US 8,775,876 B2
(45) Date of Patent: Jul. 8, 2014

(54) METHOD TO IMPROVE I/O RELIABILITY ON A DEGRADED WIDE PORT CONNECTION

(75) Inventor: Francis A. Wiran, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 301 days.

(21) Appl. No.: 13/302,014

(22) Filed: Nov. 22, 2011

(65) Prior Publication Data

US 2013/0132782 A1    May 23, 2013

(51) Int. Cl.
*G06F 11/00*    (2006.01)
*G06F 11/07*    (2006.01)

(52) U.S. Cl.
CPC ........ *G06F 11/0745* (2013.01); *G06F 11/0757* (2013.01); *G06F 11/076* (2013.01)
USPC ............ 714/47.2; 714/4.1; 714/47.1; 714/48; 714/56

(58) Field of Classification Search
USPC ........ 714/4.1, 4.11, 4.12, 4.2, 4.5, 25, 27, 39, 714/43, 47.1, 47.2, 48, 56
See application file for complete search history.

(56) References Cited

U.S. PATENT DOCUMENTS

| | | | |
|---|---|---|---|
| 7,738,366 B2 | 6/2010 | Uddenberg et al. | |
| 7,890,794 B1 * | 2/2011 | Gasser | 714/5.1 |
| 7,912,995 B1 | 3/2011 | Long et al. | |
| 2007/0070885 A1 * | 3/2007 | Uddenberg et al. | 370/225 |
| 2008/0010530 A1 * | 1/2008 | Davies et al. | 714/31 |
| 2011/0138097 A1 * | 6/2011 | Nakajima et al. | 710/316 |
| 2012/0246521 A1 * | 9/2012 | Washiya et al. | 714/48 |

* cited by examiner

*Primary Examiner* — Joseph D Manoskey
(74) *Attorney, Agent, or Firm* — Suiter Swantz pc llo

(57) ABSTRACT

A method and system for controller level identification and isolation of a degraded physical link (PHY) in a serial attached small computer system interface (SA-SCSI) or SAS domain. The method and system uses computer readable code embodied within the controller level of an SAS domain to monitor a plurality of PHY pairs associated as connecting through a wide port. The invention compares a history of PHY pair errors to a tunable timer to determine if PHY errors reach a threshold. Should the threshold be exceeded, the controller disables the error prone PHY pair and delivers a notification. The controller may then re-enable the disabled PHY after user action or port power up.

20 Claims, 4 Drawing Sheets

402: using a computing device or processor, the computing device or processor configured to operate non-transitory computer readable code embodied within controller level intelligence of an SAS domain, to accomplish the steps of 404: receiving an adjustable PHY stabilization timer delay 406: receiving an adjustable error threshold 408: monitoring a plurality of PHY pairs, the plurality of PHY pairs associated as connecting through a wide port 410: monitoring a status of said wide port 412: recording, to an error history register storage operatively connected to said computer device, a history of errors of each of said monitored PHY pairs 414: comparing said history of errors of at least one monitored PHY pair with said adjustable error threshold 416: disabling said at least one monitored PHY pair if said history of errors of at least one monitored PHY pair exceeds said adjustable error threshold 418: enabling said at least one monitored PHY pair if said status of said wide port indicates an unconnected state 420: delivering a notification of the disabling and enabling

FIG. 4

502 — a computing device or processor, the computing device or processor configured to operate non-transitory computer readable code embodied within the controller level intelligence of an SAS domain; a data storage operatively connect to said computing device; wherein said non-transitory computer readable code is configured to 504 — receive an adjustable PHY stabilization timer delay 506 — receive an adjustable error threshold 508 — monitor a plurality of PHY pairs, the plurality of PHY pairs associated as connecting through a wide port 510 — monitor a status of said wide port 512 — record, to an error history register operatively embodied within said date storage, a history of errors of each of said monitored PHY pairs 514 — compare said history of errors of at least one monitored PHY pair with said adjustable error threshold 516 — disable said at least one monitored PHY pair if said history of errors of at least one monitored PHY pair exceeds said adjustable error threshold 518 — enable said at least one monitored PHY pair if said status of said wide port indicates an unconnected state 520 — deliver a notification of the disable and enable

METHOD TO IMPROVE I/O RELIABILITY ON A DEGRADED WIDE PORT CONNECTION

TECHNICAL FIELD

The present disclosure relates generally to the field of reliable communication between serial attached small computer system interface (SAS) devices operating in a computing environment and more specifically to controller level detection and correction of a faulty physical link between a pair of SAS devices operating in the physical layer of a computing environment.

BACKGROUND

Hardware devices operating in a computing environment must properly communicate to achieve desired results. Well known levels of topography may exist in a serial attached small computer system interface (SA-SCSI) or SAS architecture. At the controller level, operational control exists for devices operating at the device or expander level. A physical device which acts to connect the two (controller connecting to expander) hardware communication points of such hardware devices may be commonly referred to as a physical link or PHY. A single PHY may connect via a port to allow communication between controller and expander. Alternatively, multiple PHYs may be grouped through a single port where the port is then known as a wide port. This wide port architecture may allow a controller to communicate to multiple expanders or devices. For example, multiple PHYs may communicate through a single wide port to connect a controller with multiple expanders. A PHY at the controller level connected to a PHY at the expander level may form a PHY pair. Over time, one or more PHY pairs may become unreliable resulting in degraded communication between the controller and device. Such unreliability may occur due to a damaged cable, abnormal operating temperature, electromagnetic interference (EMI), degraded transceivers and the like. While the wide port in general may be operational, any input/output (I/O) transiting the unreliable PHY pair may suffer error. This I/O error may lead to significant unstable activity such as frequent buffer flushes and retries. Further, this unstable activity may manifest itself in large I/O data transfers having only a portion of data going through the unreliable PHY pair.

PHY pairs may, as connection points, maintain a controller side and an expander side. The controller side may refer to the dominant side of the communication link while the expander side may refer to the side of the PHY pair of lesser dominance or as being in a controlled state. Preservation of bandwidth between controller and expander may be a common goal to increase speed of data travel between the PHY pair. Consequently, the use of an alternate communication path to determine PHY status may be desired.

Previous attempts at isolation of an unreliable PHY pair have focused on the expander side of the PHY pair. U.S. Pat. No. 7,738,366 to Uddenberg, et al. discloses disabling a PHY pair in an expander port based on error reading on the expander side itself. The intelligence exists on the expander side as the decision of whether or when to disable an expander port is made on the expander. While the Uddenberg patent may disable a PHY, it does not disclose criteria used to make the disabling decision. Further, Uddenberg's use of intelligence existing on the expander side may create conflict between multiple expander devices attempting to disable a single or multiple PHYs connecting through the same wide port. Such conflict within a wide port may cause additional errors.

Similarly, U.S. Pat. No. 7,912,995 to Long, et al., discloses intelligence on the SAS device side to determine a probationary state given a PHY as PHY errors reach a threshold. Again, decisions made on the expander/device side of the PHY pair may lead to additional errors in the wide port overall. Further, Long's disclosure is limited to partial depowering of a PHY pair as indicated by the ability of the PHY pair to sense an unplugged cable.

With no existing solution, reliability of the I/O transiting the erroneous PHY pair may be impaired. This impairment may trigger various faults such as random I/O timeout, retries of I/O transmission, and overall performance loss due to buffer flushes and retries of the I/O.

Therefore, it would be advantageous if a method and system existed providing for controller level detection and correction of a degraded I/O signal transmitted/received between a PHY pair.

SUMMARY

In a preferred aspect of the current invention, a method and system for improved I/O reliability in a degraded wide port connection comprises controller level intelligence in PHY monitoring, decision making, and operation. The method and system may use an error history register implemented in the controller level of the hardware that may count the number of errors occurring in a PHY link. A tunable timer may monitor the error count and compare the error count to the error history register within the period. If the PHY error count may exceed a certain threshold, the controller deems the PHY link to be in a degraded state. Controller level firmware may disable the degraded PHY in the wide port. Controller level firmware may then send an event notifying a hardware driver of the degraded state. Controller level firmware may sense the state of the remaining enabled phys to determine if the port has been disconnected. If so, controller level firmware will re-enable all the phys in preparation for port reconnection as part of the user corrective action.

In an additional aspect of the present invention, improved I/O reliability in a degraded wide port connection may extend to a narrow port connection. Further, the concepts described herein may extend to a controller PHY link to a faulty single device. For example, a single device experiencing repeat serial advanced technology attachment (SATA) initialization failures may be isolated from the system using concepts disclosed herein. The PHY link between controller and SATA drive through a narrow port may be disabled. In this additional aspect, user input may be required to reactivate the disabled PHY after user takes corrective action (e.g. cable replacement).

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 4 is block diagram illustrating an implementation of the method to improve reliability in a degraded wide port connection representative of a preferred embodiment of the present invention;

FIG. 5 is block diagram illustrating an implementation of the system to improve reliability in a degraded wide port connection representative of a preferred embodiment of the present invention.

DETAILED DESCRIPTION

Reference will now be made in detail to the subject matter disclosed, which is illustrated in the accompanying drawings.

Figure 1:
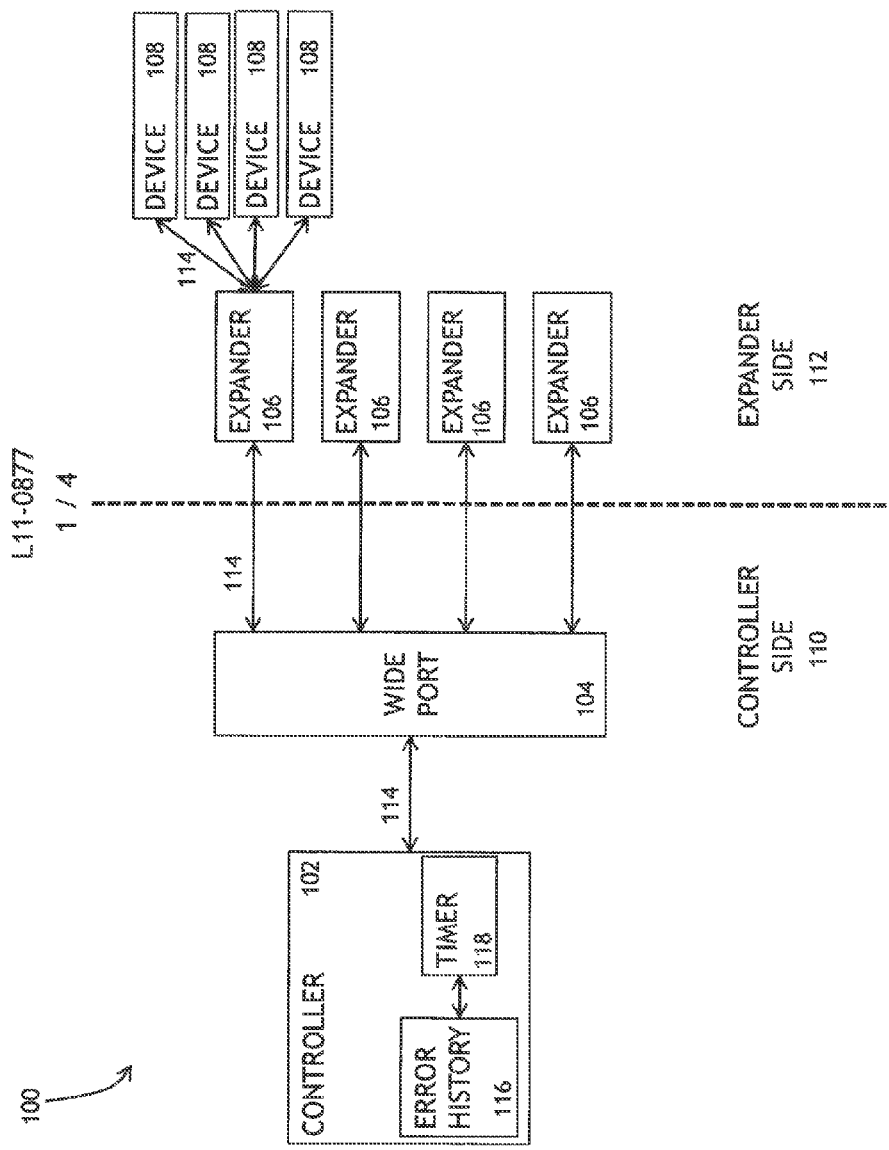
FIG. 1 is a flow diagram illustrating a preferred embodiment of the logic path found in the present invention.

Referring to FIG. 1, an overview of a preferred embodiment of the system for improved I/O reliability in a degraded wide port connection is shown. System 100 may comprise SAS controller 102 which controls the various computing environment communication components. System 100 may further comprise controller level 110 intelligence which may control a plurality of PHYs 114 connecting through a wide port 104. In an SAS domain, PHYs 114 may be used to connect controller 102 through wide port 104 and expander 106 to a plurality of devices 108. Distinguishing from decision making intelligence existing on an expander side 112, controller side 110 intelligence is the sole situs for intelligence in system 100. Controller level 110 intelligence may comprise an error history register 116 implemented in the controller 102 hardware. Error history register 116 may maintain a count of the number of errors that may occur in at least one of the plurality of monitored PHYs. Controller level 110 intelligence may further include a timer 118. The timer 118 may be tunable by an operator to a user-tuned period to enhance flexibility in wide port PHY control. Timer 118 may be in direct communication with error history register 116. Controller level 110 intelligence may compare user-tuned period with error history register count to obtain a difference. If the difference may exceed a certain threshold as set by the user, the controller may deem the PHY link to be in a degraded state. Controller level 110 firmware may then disable the degraded PHY link 114. Controller level 110 firmware may then send an event notifying a driver of the degraded state. Of particular note, event communication notifying a driver or user of error status occurs above the controller level via a vendor specific event notification, circumventing the need to follow standards.

Further, system 100 may, in its notification to a user, explain the steps required for user to recover from the error status. Additionally, system 100 may inform a user of how the controller has or may reset the error condition to normal state indicating automatic reset by a controller or user response to command controller to reset.

Controller level 110 intelligence may not command the comparison at certain times during PHY link connection. For example, when PHY link is in a reset process or PHY link is initially powering up, an error count may be expected to be abnormally high. During phases such as this, error comparison for a specific PHY pair may be disabled. However, once controller level 110 intelligence considers the PHY link operational and stable, the comparison method will be activated. This delay in activation may be incorporated with a tunable timer value (for example, 1 second after link up or power up).

On occasion, the wide port through which the plurality of PHYs connect may become unconnected or unpowered. This unpowered or unconnected state may also be known as the wide port being "down." Additionally, a port may be down for physical disconnect of a cord or connection. During the period when the wide port is down, controller level firmware will automatically re-enable each monitored PHY, including previously disabled PHYs, and all PHYs would be ready to link up again once the wide port becomes powered or "up." As the PHYs are connected to each target, the controller level 110 intelligence may, as above, ignore an abnormally high error count for a user defined start-up period. After expiration of the start-up period where errors are ignored, should the error count exceed the set threshold, the PHY will again be disabled. The current invention may further send a notification event to a user of the current PHY status. Should notifications become too frequent or not desired, this notification feature may be disabled via settings in a non-volatile memory.

A single PHY may connect through a single port. In this situation where a single PHY connects through a single port the single port may be known as a narrow port. Alternatively, a plurality of PHYs may connect through a single port. In this situation the port may be considered a wide port. Under normal operation, the method described herein may be limited in use to a wide port. Controller level firmware may not attempt to disable a PHY pair connecting through a narrow port. One goal of the current method is simplicity. Controller level firmware may be limited to controlling a plurality of PHYs, whereas controller level firmware may not be responsible for controlling status of a port. Controller level firmware may respond to a wide port becoming up or down but may not control the up or down status of the wide port. To avoid the complexity of trying to activate or deactivate a narrow port, controller level intelligence may be limited to PHY control and exclude narrow port control.

Alternatively, controller level intelligence of narrow port PHY control may be found within the scope of this invention. Logic configured to control a wide port PHY may extend to control a narrow port PHY. For example, a single device connecting through a narrow port PHY may experience repeat serial advanced technology attachment (SATA) initialization failures. This device may be isolated from the system using concepts disclosed herein. The PHY link between controller and SATA drive may be disabled by controller level logic. In this additional aspect, user input may be required to reactivate the disabled PHY after user takes corrective action (e.g. cable replacement).

Figure 2:
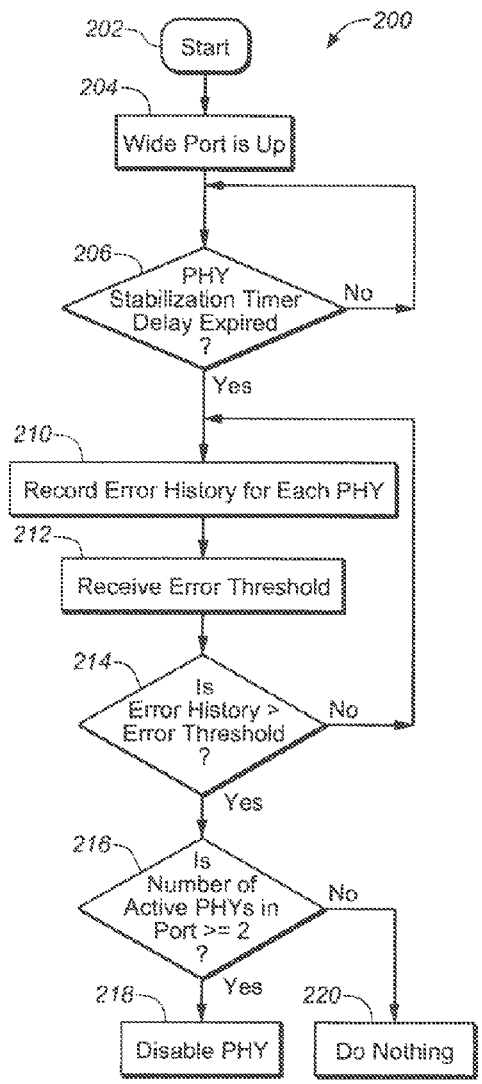
FIG. 2 is a flow diagram illustrating a preferred embodiment of the logic path found in the present invention.

Referring to FIG. 2, a logic flow diagram for method 200 to improve I/O reliability on a degraded wide port connection is shown. The logic path begins at start 202. Method 200 determines if the port is in operation at step 204. Should the method find the port is not in operation, logic passes to step 302 of FIG. 3. Method 200 next determines at step 206 whether an adjustable PHY stabilization timer delay has expired since the PHY became operational. If the delay has not expired the method continues to loop to the beginning of step 206 to wait for the expiration of the delay. Method 200 continues at step 210 recording error history for each monitored PHY. The error history may be saved to readable storage operatively connected to the controller.

Continuing with reference to FIG. 2, step 212 receives an input of an adjustable error threshold for error comparison. This error threshold may be defined as the number of errors per unit of time which a user considers acceptable. Controller level intelligence continuously monitors PHYs while the threshold timer runs. Step 214 compares the number of PHY errors per unit of time (the error history) with the error threshold to determine if the threshold has been exceeded. Step 216 determines whether the port in use is wide or narrow. If the number of active PHYs is greater than one, logic will continue to step 218 to disable the PHY in the wide port. Should controller level intelligence find a narrow port is in use, the method 200 will take no action 220.

Figure 3:
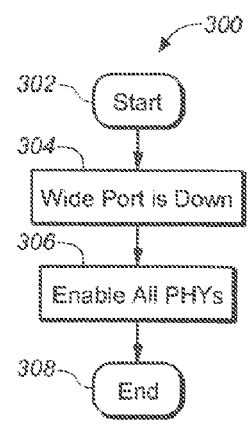
FIG. 3 is a flow diagram illustrating a preferred embodiment of the logic path found in the present invention.

Referring to FIG. 3, a logic flow diagram to improve I/O reliability on a degraded wide port connection is shown. This sequence enables all the PHYs for operation as soon as the wide port becomes operational. For example, if a wide port becomes depowered or physically disconnected, the PHYs will be enabled for operation as the port is re-powered/re-connected. The logic path begins for method 300 at start 302. Method 300 follows this path should the port not be operational. Step 304 determines whether the port is down. Step 306 enables all PHYs to ready said PHYs for operation when the port comes up. Step 308 ends the logic.

Referring to FIG. 4, a block diagram illustrating a preferred embodiment method 400 for improved I/O reliability on a degraded wide port connection is shown. Method 400 may comprise 402 using a computing device or processor, the computing device or processor configured to operate non-transitory computer readable code embodied within the controller level intelligence of an SAS domain, the non-transitory computer readable code configured to accomplish the steps of: receiving an adjustable PHY stabilization timer delay 404; receiving an adjustable error threshold 406; monitoring a plurality of PHY pairs, the plurality of PHY pairs associated as connecting through a wide port 408; monitoring a status of said wide port 410; recording, to an error history register storage operatively connected to said computer device, a history of errors of each of said monitored PHY pairs 412; comparing said history of errors of at least one monitored PHY pair with said adjustable error threshold 414; disabling said at least one monitored PHY pair if said history of errors of at least one monitored PHY pair exceeds said adjustable error threshold 416; enabling said at least one monitored PHY pair if said status of said wide port indicates an unconnected state 418; and delivering a notification of the disabling and enabling 420.

Referring to FIG. 5, a block diagram illustrating a preferred embodiment of system 500 for improved I/O reliability on a degraded wide port connection. A preferred goal of system 500 may comprise controller level identification and isolation of a degraded physical link (PHY) in a serial attached small computer system interface (SAS) domain. Said controller level system 500 may comprise: a computing device or processor, the computing device or processor configured to operate non-transitory computer readable code embodied within the controller level intelligence of an SAS domain; and a data storage operatively connect to said computing device 502; wherein said non-transitory computer readable code is configured to: receive an adjustable PHY stabilization timer delay 504; receive an adjustable error threshold 506; monitor a plurality of PHY pairs, the plurality of PHY pairs associated as connecting through a wide port 508; monitor a status of said wide port 510; record, to an error history register operatively embodied within said date storage, a history of errors of each of said monitored PHY pairs 512; compare said history of errors of at least one monitored PHY pair with said adjustable error threshold 514; disable said at least one monitored PHY pair if said history of errors of at least one monitored PHY pair exceeds said adjustable error threshold 516; enable said at least one monitored PHY pair if said status of said wide port indicates an unconnected state 518; and deliver a notification of the disable and enable 520.

It should be recognized that while the above description describes the concept of for improved I/O reliability on a degraded wide port connection, the above description does not represent a limitation but merely an illustration.

In the present disclosure, the methods disclosed may be implemented as sets of instructions or software readable by a device. Such software may a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for controller level identification and isolation of a degraded physical link (PHY) in a serial attached small computer system interface (SAS) domain, the method comprising:

using a computing device or processor, the computing device or processor configured to operate non-transitory computer readable code embodied within controller level intelligence of an SAS domain, to accomplish the steps of:

receiving an adjustable PHY stabilization timer delay;

receiving an adjustable error threshold;

monitoring a plurality of PHY pairs, the plurality of PHY pairs associated as connecting through a wide port, said monitoring after expiration of said adjustable PHY stabilization timer delay;

monitoring a status of said wide port, said monitoring after expiration of said adjustable PHY stabilization timer delay;

recording, to an error history register storage operatively connected to said computer device, a history of errors of each of said monitored PHY pairs;

comparing said history of errors of at least one monitored PHY pair with said adjustable error threshold;

disabling said at least one monitored PHY pair if said history of errors of at least one monitored PHY pair exceeds said adjustable error threshold;

enabling said at least one monitored PHY pair if said status of said wide port indicates an unconnected state; and delivering a notification of the disabling and enabling.

2. The method of claim 1, wherein said adjustable PHY stabilization timer delay further comprises at least one of a power-up delay, a reconnect delay, and a port power-up delay.

3. The method of claim 1, wherein said adjustable error threshold further comprises at least one of a human user input, a controller level input, and a device input.

4. The method of claim 1, wherein said monitoring a plurality of PHY pairs further comprises monitoring a single PHY connecting through a wide port and a single PHY connecting through a narrow port.

5. The method of claim 1, wherein said monitoring a status of said wide port further comprises monitoring at least one of powered sate, depowered state, connected state, unconnected state, and degraded state.

6. The method of claim 1, wherein said recording a history of errors of each of said monitored PHY pairs further comprises recording at least one of a frequency of errors, a duration of error, a severity of error, and a magnitude of error.

7. The method of claim 1, wherein said comparing said history of errors of at least one monitored PHY pair with said adjustable error threshold further comprises a comparison of at least one of a frequency of errors, a duration of error, a severity of error, and a magnitude of error.

8. The method of claim 1, wherein said disabling said at least one monitored PHY pair further comprises one of depowering a PHY pair, sending a message to a user to physically disconnect a PHY pair, and depowering a device to which the PHY pair is connected.

9. The method of claim 1, wherein said enabling said at least one monitored PHY pair if said status of said wide port indicates an unpowered state further comprises enabling a PHY pair connected through a narrow port.

10. The method of claim 1, wherein said notifying the user of the disabling and enabling further comprises notifying a driver of said disabling and enabling.

11. A system for controller level identification and isolation of a degraded physical link (PHY) in a serial attached small computer system interface (SAS) domain, the system comprising:
a computing device or processor, the computing device or processor configured to operate non-transitory computer readable code embodied within the controller level intelligence of an SAS domain;
a data storage operatively connected to said computing device;
wherein said non-transitory computer readable code is configured to:
receive an adjustable PHY stabilization timer delay;
receive an adjustable error threshold;
monitor a plurality of PHY pairs, the plurality of PHY pairs associated as connecting through a wide port, said monitoring after expiration of said adjustable PHY stabilization timer delay;
monitor a status of said wide port, said monitoring after expiration of said adjustable PHY stabilization timer delay;
record, to an error history register operatively embodied within said date storage, a history of errors of each of said monitored PHY pairs;
compare said history of errors of at least one monitored PHY pair with said adjustable error threshold;
disable said at least one monitored PHY pair if said history of errors of at least one monitored PHY pair exceeds said adjustable error threshold;
enable said at least one monitored PHY pair if said status of said wide port indicates an unconnected state; and
deliver a notification of the disable and enable.

12. The method of claim 11, wherein said adjustable PHY stabilization timer delay further comprises at least one of a power-up delay, a reconnect delay, and a port power-up delay.

13. The method of claim 11, wherein said adjustable error threshold further comprises at least one of a human user input, a controller level input, and a device input.

14. The method of claim 11, wherein said monitor a plurality of PHY pairs further comprises monitoring a single PHY connecting through a wide port and a single PHY connecting through a narrow port.

15. The method of claim 11, wherein said monitor a status of said wide port further comprises monitoring at least one of powered sate, depowered state, connected state, unconnected state, and degraded state.

16. The method of claim 11, wherein said record a history of errors of each of said monitored PHY pairs further comprises recording at least one of a frequency of errors, a duration of error, a severity of error, and a magnitude of error.

17. The method of claim 11, wherein said compare said history of errors of at least one monitored PHY pair with said adjustable error threshold further comprises a comparison of at least one of a frequency of errors, a duration of error, a severity of error, and a magnitude of error.

18. The method of claim 11, wherein said disable said at least one monitored PHY pair further comprises one of depowering a PHY pair, sending a message to a user to physically disconnect a PHY pair, and depowering a device to which the PHY pair is connected.

19. The method of claim 11, wherein said enable at least one monitored PHY pair if said status of said wide port indicates an unconnected state further comprises enabling a PHY pair connected through a narrow port.

20. The method of claim 11, wherein said notify the user of the disabling and enabling further comprises notifying a driver of said disabling and enabling.

* * * * *